UNITED STATES PATENT OFFICE.

FREDERICK SIMON, OF NEW YORK, N. Y.

IMPROVEMENT IN METHODS OF GIVING SMOOTH SURFACES TO HARD RUBBER IN THE MOLD.

Specification forming part of Letters Patent No. 32,901, dated July 23, 1861.

*To all whom it may concern:*

Be it known that I, FREDERICK SIMON, of New York city, in the State of New York, have invented a new and useful Improvement in the Manufacture of Hard India-Rubber and Gutta-Percha; and I do hereby declare that the following is a full and exact description thereof.

In the manufacture of flat and even hard india-rubber and gutta-percha articles it is of the utmost importance to preserve a smooth and bright surface during the process of vulcanization, so that the articles, after being hardened or cured, present a jet-black and bright-looking surface. To effect this various processes can be used. The rubber or gutta-percha, after it is mixed in the usual way well-known to manufacturers of hard india-rubber and gutta-percha compounds, is then rolled out by the use of the calendar-rollers—a well-known rubber-machine—into flat sheets of any required size and thickness. These sheets are then, while the compound is yet in its plastic and unvulcanized state, covered with tin-foil on both sides; or they are laid between metal plates, which are made to adhere to the rubber or gutta-percha sheets by pressing them on by the use of rollers or the weight of steady screw-pressure; or they are laid between solid metal molds, by which the sheets or articles are confined during the process of vulcanization. By any of these different methods a smooth and flat and frequently bright surface is effected; but two difficulties are experienced, which I will now explain.

While tin-foil and its equivalent—viz., very thin flexible and pliable metal foils or leaves—can be easily rolled on the rubber, so that the same adheres to it during the vulcanizing process, a great deal of difficulty is experienced when heavier and thicker metal plates or sheets are used, which have not flexibility enough to cling and adhere thoroughly to the rubber or gutta-percha before as well as during the vulcanization. The rigidity of the metal plates does not well conform to the soft pliability of the plastic-rubber or gutta-percha sheets, and frequently the metal plates are separated or loosened from the surface of the rubber or gutta-percha sheets before as well as during the process of curing.

To rub the surface of the rubber or gutta-percha sheets with grease or oil before laying the metal cover on has been practiced with some success; but while it answered for pliable tin-foil it was not only utterly useless, but even pernicious, when practiced with thick and rigid metal sheets. The reason is obvious: The surface of the rubber or gutta-percha sheets, by being rubbed with grease or oil, becomes slippery, and when the rigid metal sheets are rolled on they slip on the surface of the rubber sheets. A uniform and perfect contact is not obtained by this method. The second difficulty which I have alluded to occurs when the rubber or gutta-percha sheets, after they are hardened or vulcanized, are stripped or parted from the metal sheets. While tin-foil, which is pliable and flexible, can be easily torn off from the vulcanized sheets of gutta-percha or India-rubber, much trouble and inconvenience are experienced in detaching the hardened india-rubber or gutta-percha sheets from rigid metal sheets. To brass sheets and to tinned-iron sheets the vulcanized india-rubber or gutta-percha sometimes adheres so closely that separating the same frequently breaks the hard rubber or gutta-percha sheets, and at the same time spoils the metal sheets by bending and wrinkling. These difficulties are entirely avoided by my improved process, which I shall now describe.

I take some pure, cleaned, unmixed india-rubber or gutta-percha and dissolve the same in spirits of turpentine. The turpentine I generally keep in a well-closed vessel, and the proportion of the pure rubber I frequently vary. If I want to obtain a thick, sticky solution, I increase the proportion of the pure rubber or gutta-percha, whereas when anxious to get a very liquid solution the proportion of the rubber is accordingly decreased. As a rule, I never take more than six ounces of rubber to one gallon of spirits of turpentine. After this solution is prepared I apply it in the manufacture of hard india-rubber or gutta-percha compounds, as follows: After the gutta-percha or india-rubber is run out by calendar-rolls to the required thickness and cut into sheets of the required size it is covered with metal sheets; but before it is placed between the sheets of metal I cover both sides of the plastic india-rubber or gutta-percha sheets with a thin layer of the solution or paste of india-rubber or turpentine. I do this generally by rubbing the solution on with a brush. When one side of the rubber sheet is covered with the solution I then place that side on the metal sheet and repeat the same operation on the other side of the rubber sheet. Then I lay a metal sheet upon it. The whole is then brought in close contact by passing over it with a heavy iron roller or pressing it together by any other means. The pure and liquid rubber solution, which covers the surface of the compound, causes, by its sticky properties, a close and thorough adhesion of the rubber sheet to the metal plates, as well before as during the vulcanization. After the curing process the hardened rubber sheets are parted from the metal plates without any difficulty. The result which I obtain in this way is good and reliable. No blisters will form between the metal and the rubber, and the rubber or gutta-percha sheets, after being vulcanized, present a smooth and bright surface.

I do not wish to be understood as claiming the heating or vulcanizing of india-rubber or gutta-percha, nor the oiling or greasing of the rubber or gutta-percha sheets, nor the covering of the plastic-rubber or gutta-percha sheets with tin-foil or any other metal plates or molds, as none of these methods form any part of my invention.

My invention consists in covering the green and plastic india-rubber or gutta-percha sheets with a solution or paste of pure india-rubber or gutta-percha and spirits of turpentine, for the purpose of making the metal adhere to the rubber during and giving brightness to the rubber after vulcanization.

Having thus fully described my invention, what I claim, and desire to secure by Letters Patent of the United States, is—

The method hereinbefore described of giving smooth surfaces to articles of india-rubber or gutta-percha intended to be molded or enveloped in metal plates by coating them, prior to being included in the metallic plates, with a solution of rubber and turpentine, substantially as above set forth.

FRED. SIMON.

Witnesses:
JAMES WILKINSON,
OSCAR FALKE.